United States Patent
Golden et al.

(10) Patent No.: US 7,404,846 B2
(45) Date of Patent: Jul. 29, 2008

(54) ADSORBENTS FOR RAPID CYCLE PRESSURE SWING ADSORPTION PROCESSES

(75) Inventors: Timothy Christopher Golden, Allentown, PA (US); Edward Landis Weist, Jr., Macungie, PA (US); Paul Anthony Novosat, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 233 days.

(21) Appl. No.: 11/114,298

(22) Filed: Apr. 26, 2005

(65) Prior Publication Data

US 2006/0236862 A1 Oct. 26, 2006

(51) Int. Cl.
*B01D 53/047* (2006.01)

(52) U.S. Cl. .............................. 95/103; 95/130; 95/139; 95/140; 95/143

(58) Field of Classification Search ............. 95/96–106, 95/130, 139, 140, 143, 148, 901, 902; 96/132
See application file for complete search history.

(56) References Cited

U.S. PATENT DOCUMENTS

| | | | |
|---|---|---|---|
| 2,882,243 A | 4/1959 | Milton | |
| 2,882,244 A | 4/1959 | Milton | |
| 3,011,589 A | 12/1961 | Meyer | |
| 3,078,635 A | 2/1963 | Milton | |
| 3,078,639 A | 2/1963 | Milton | |
| 3,111,387 A | 11/1963 | Avery et al. | |
| 3,140,932 A | 7/1964 | McKee | |
| 3,150,942 A | 9/1964 | Vasan | |
| 3,176,444 A | 4/1965 | Kiyonaga | |
| 3,313,091 A | 4/1967 | Berlin | |
| 3,430,418 A | 3/1969 | Wagner | |
| 3,564,816 A | 2/1971 | Batta | |
| 3,720,042 A | 3/1973 | Simonet | |

(Continued)

FOREIGN PATENT DOCUMENTS

EP 0606848 A1 7/1994

(Continued)

OTHER PUBLICATIONS

Anonymous: "UOP Molecular Sieves" Internet, [Online] pp. 132-138, XP002396279 Retrieved from the Internet: URL: http://www.asge-online.com/pdf/MSieves.pdf#search=%22uop%20molecular%20sieve%205a%22> [retrieved on Aug. 24, 2006] UOP Molecular Sieves.

*Primary Examiner*—Frank M Lawrence
(74) *Attorney, Agent, or Firm*—Keith D. Gourley

(57) ABSTRACT

Method for the separation of a gas mixture comprising providing a PSA system with at least one adsorber vessel containing adsorbent material that is selective for the adsorption of carbon monoxide and nitrogen, passing a feed gas mixture containing at least hydrogen and carbon monoxide and optionally containing nitrogen through the adsorbent material in a feed step and withdrawing a purified hydrogen product from the adsorber vessel, wherein the feed step has a duration or feed time period of about 30 seconds or less. The adsorbent material is characterized by any of (1) a Henry's law constant for carbon monoxide between about 2.5 and about 5.5 (mmole/g)/atm; (2) a carbon monoxide heat of adsorption between about 6.0 and about 7.5 kcal/gmole; (3) a Henry's law constant for nitrogen greater than about 1.5 (mmole/g)/atm; and (4) a selectivity of carbon monoxide to nitrogen between about 5.0 and about 8.0.

15 Claims, 3 Drawing Sheets

Adsorber

| 1 | Feed | | Press. Equal. | Provide Purge | Blow-down | Purge | Press. Equal. | Repress. |
|---|---|---|---|---|---|---|---|---|
| 4 | Press. Equal. | Repress. | Feed | | Press. Equal. | Provide Purge | Blow-down | Purge |
| 3 | Blow-down | Purge | Press. Equal. | Repress. | Feed | | Press. Equal. | Provide Purge |
| 2 | Press. Equal. | Provide Purge | Blow-down | Purge | Press. Equal. | Repress. | Feed | |

Time ⟶

U.S. PATENT DOCUMENTS

| | | |
|---|---|---|
| 3,723,561 A | 3/1973 | Priegnitz |
| 3,838,553 A | 10/1974 | Doherty |
| 3,885,927 A | 5/1975 | Sherman et al. |
| 3,986,849 A | 10/1976 | Fuderer et al. |
| 4,171,206 A | 10/1979 | Sircar |
| 4,194,892 A | 3/1980 | Jones et al. |
| 4,477,267 A | 10/1984 | Reiss |
| 4,481,018 A | 11/1984 | Coe et al. |
| 4,544,378 A | 10/1985 | Coe et al. |
| 4,557,736 A | 12/1985 | Sircar et al. |
| 4,765,808 A | 8/1988 | Oigo et al. |
| 4,775,396 A | 10/1988 | Rastelli et al. |
| 4,813,980 A | 3/1989 | Sircar |
| 4,859,217 A | 8/1989 | Chao |
| 4,925,460 A | 5/1990 | Coe et al. |
| 4,943,304 A | 7/1990 | Coe et al. |
| 4,957,514 A | 9/1990 | Golden et al. |
| 5,152,813 A | 10/1992 | Coe et al. |
| 5,258,058 A | 11/1993 | Coe et al. |
| 5,258,060 A | 11/1993 | Gaffney et al. |
| 5,266,102 A | 11/1993 | Gaffney et al. |
| 5,268,023 A | 12/1993 | Kirner |
| 5,354,360 A | 10/1994 | Coe et al. |
| 6,340,382 B1 | 1/2002 | Baksh et al. |
| 6,503,299 B2 | 1/2003 | Baksh et al. |
| 6,605,136 B1 | 8/2003 | Graham et al. |
| 2003/0172808 A1 | 9/2003 | Le Bec |
| 2006/0236863 A1* | 10/2006 | Weist et al. .......... 95/96 |

FOREIGN PATENT DOCUMENTS

| | | |
|---|---|---|
| EP | 0 733 394 A1 | 9/1996 |
| EP | 0 855 209 A1 | 7/1998 |
| EP | 1097902 A1 | 5/2001 |
| EP | 1342497 A1 | 9/2003 |
| JP | 01304042 A * | 12/1989 |

* cited by examiner

ADSORBENTS FOR RAPID CYCLE PRESSURE SWING ADSORPTION PROCESSES

BACKGROUND OF THE INVENTION

Pressure swing adsorption is a well-known method for the separation of bulk gas mixtures and for the purification of gas streams containing undesirable impurities. The method has been developed and adapted for a wide range of feed gases, operating conditions, product recovery, and product purity. Most large pressure swing adsorption (PSA) systems utilize multiple parallel adsorber beds operated in staggered sequential cycles using typical process steps of feed/adsorption, pressure equalization, depressurization, evacuation, purge, and repressurization. These PSA systems are widely used in the chemical process industries for the recovery and purification of valuable gaseous products such as hydrogen, carbon oxides, synthesis gas, light hydrocarbons, and atmospheric gases.

The design and operation of these PSA systems can present complex engineering challenges because of the large number of variables and parameters involved. These variables and parameters may include, for example, adsorbent type, adsorbent particle size, bed length/diameter ratio, gas flow velocities, gas residence times, type of PSA operating cycle, duration of steps in the PSA cycle, number of adsorbent beds, feed gas pressure, feed gas composition, product throughput, and product purity.

A large worldwide market exists for the supply of high-purity hydrogen in the chemical process, metals refining, and other related industries. A typical commercial method for the production of hydrogen to satisfy this market is the reforming of natural gas or other methane-rich hydrocarbon streams. The reforming process is carried out by reacting the hydrocarbon with steam and/or an oxygen-containing gas (e.g., air or oxygen-enriched air), producing a crude reformate gas containing hydrogen, carbon oxides, water, residual hydrocarbons, and nitrogen. If carbon monoxide recovery is not required and hydrogen is the main product, the carbon monoxide may be converted to additional hydrogen and carbon dioxide by the water gas shift reaction to yield a shifted synthesis gas. Hydrogen recovery from this shifted synthesis gas typically includes a multiple-bed PSA process in which each adsorbent bed uses a layer of activated carbon for the removal of $CO_2$ and $CH_4$ followed by a layer of zeolite or molecular sieve adsorbent for the removal CO and $N_2$. Other hydrogen-rich gas sources that can be upgraded by PSA technology to provide a high purity hydrogen product include refinery off-gases containing hydrogen and $C_1$-$C_6$ hydrocarbons, and include effluent streams from hydrocarbon partial oxidation units.

The overall cost of hydrogen from integrated reformer/PSA systems includes both capital and operating cost components. The economic production of high-purity hydrogen requires low operating and capital costs, wherein the capital costs depend largely upon the size of the reformer and the size of the vessels containing the PSA adsorbent beds. PSA bed size typically decreases as the hydrogen productivity (i.e., the amount of hydrogen produced per unit bed volume) of the PSA system increases, and the bed size also decreases as the hydrogen bed size factor (i.e., the volume of adsorbent bed required to produce a given amount of hydrogen product) of the PSA system decreases. Clearly, a smaller bed size factor and a larger hydrogen productivity are preferred.

Hydrogen productivity and recovery in PSA systems can be increased by improved process cycles and/or improved adsorbents. For example, the use of improved rapid cycle PSA processes can improve the overall economics of hydrogen production, since the size and cost of the reformer is impacted significantly by the performance of the PSA system, and improvements in PSA hydrogen recovery result directly in a smaller reformer. Improvements in PSA hydrogen recovery also result in a reduced demand for reformer feed gas, i.e. natural gas, which constitutes the largest operating cost of the reformer.

There is a need in the field of hydrogen production for improved design and operating methods to reduce overall capital and operating costs. This may be achieved by the use of improved PSA systems for final hydrogen recovery and purification, particularly by the application of improved rapid cycle processes in these PSA systems. This need is addressed by the embodiments of the present invention described below and defined by the claims that follow.

BRIEF SUMMARY OF THE INVENTION

An embodiment of the present invention relates to a method for the separation of a gas mixture comprising (a) providing a feed gas mixture containing at least hydrogen and carbon monoxide and optionally containing nitrogen; (b) providing a pressure swing adsorption system having a plurality of adsorber vessels, each vessel having an inlet and an outlet; (c) providing a bed of adsorbent material disposed within each adsorber vessel, wherein the adsorbent material is selective for the adsorption of carbon monoxide and nitrogen; and (d) initiating a feed step that comprises (1) introducing the feed gas mixture into the inlet of the adsorber vessel, passing the feed gas mixture through the bed of adsorbent material wherein at least a portion of the carbon monoxide is adsorbed by the adsorbent material and wherein, if nitrogen is present in the gas mixture, at least a portion of the nitrogen is adsorbed by the adsorbent material; and (2) withdrawing a purified hydrogen product from the outlet of the adsorber vessel; (e) continuing the feed step for a feed time period of about 30 seconds or less; and (f) terminating the feed step. The adsorbent material may be characterized by any of (1) a Henry's law constant for carbon monoxide between about 2.5 and about 5.5 (mmole/g)/atm; (2) a carbon monoxide heat of adsorption between about 6.0 and about 7.5 kcal/gmole; (3) a Henry's law constant for nitrogen greater than about 1.5 (mmole/g)/atm; and (4) a selectivity of carbon monoxide to nitrogen between about 5.0 and about 8.0.

In this embodiment, the adsorbent material may comprise a binder and type 5A zeolite that is 70% to 95% calcium exchanged. Alternatively, the adsorbent material may be binderless and may comprise type 5A zeolite that is 60% to 91% calcium exchanged.

The feed gas mixture may contain hydrogen, carbon monoxide, and nitrogen and may be provided by passing a reformer gas containing hydrogen, carbon monoxide, carbon dioxide, methane, and nitrogen through a bed of activated carbon to remove essentially all of the carbon dioxide and methane from the reformer gas. Each adsorber vessel may comprise an additional bed of adsorbent material disposed between the inlet of the adsorber vessel and the bed of adsorbent material that is selective for the adsorption of carbon monoxide and nitrogen, wherein the additional bed of adsorbent material is selective for the adsorption of methane and carbon dioxide.

The pressure swing adsorption system may have four parallel adsorber vessels and each adsorber vessel may be subjected in turn to the cyclic process steps comprising (1) introducing a reformer gas containing hydrogen, carbon monoxide, carbon dioxide, methane, and nitrogen during the feed time period into the inlet of a first adsorber vessel, passing the reformer gas through the beds of adsorbent material and adsorbing therein methane, carbon dioxide, carbon monoxide, and nitrogen from the reformer gas, and withdrawing the purified hydrogen product from the outlet of the adsorber vessel;

(2) depressurizing the first adsorber vessel by withdrawing a first depressurization gas from the outlet thereof and introducing the first depressurization gas into the outlet of a second adsorber vessel that is being repressurized;

(3) further depressurizing the first adsorber vessel by withdrawing a second depressurization gas from the outlet thereof and introducing the second depressurization gas into the outlet of a third adsorber vessel that is being purged;

(4) further depressurizing the first adsorber vessel by withdrawing a waste gas from the inlet thereof;

(5) purging the first adsorber vessel by introducing into the outlet thereof a second depressurization gas provided by a fourth adsorber vessel and withdrawing from the inlet of the first adsorber vessel a purge waste gas;

(6) pressurizing the first adsorber vessel by introducing into the outlet thereof a first depressurization gas provided by the second adsorber vessel;

(7) further pressurizing the first adsorber vessel by introducing a portion of the reformer gas into the inlet thereof; and (8) repeating steps (1) through (7) in a cyclic manner.

The pressure of the reformer gas typically is between about 15 and 800 psig.

Alternatively, the pressure swing adsorption system may have five parallel adsorber vessels and each adsorber vessel may be subjected in turn to the cyclic process steps comprising (1) introducing a reformer gas during the feed time period into the inlet of a first adsorber vessel, passing the reformer gas through the beds of adsorbent material and adsorbing therein methane, carbon dioxide, carbon monoxide, and nitrogen from the reformer gas, and withdrawing the purified hydrogen product from the outlet of the adsorber vessel;

(2) depressurizing the first adsorber vessel by withdrawing a first depressurization gas from the outlet thereof and introducing the first depressurization gas into the outlet of a second adsorber vessel that is being repressurized;

(3) further depressurizing the first adsorber vessel by withdrawing a second depressurization gas from the outlet thereof and introducing the second depressurization gas into the outlet of a third adsorber vessel that is being repressurized;

(4) further depressurizing the first adsorber vessel by withdrawing a third depressurization gas from the outlet thereof and introducing the third depressurization gas into the outlet of a fourth adsorber vessel that is being purged;

(5) further depressurizing the first adsorber vessel by withdrawing a fourth depressurization gas from the outlet thereof and introducing the fourth depressurization gas into the outlet of the fourth adsorber vessel that is being repressurized;

(6) further depressurizing the first adsorber vessel by withdrawing a waste gas from the inlet thereof;

(7) purging the first adsorber vessel by introducing into the outlet thereof a third depressurization gas provided by a fifth adsorber vessel and withdrawing from the inlet of the first adsorber vessel a purge waste gas;

(8) pressurizing the first adsorber vessel by introducing into the outlet thereof a fourth depressurization gas provided by the fifth adsorber vessel;

(9) further pressurizing the first adsorber vessel by introducing into the outlet thereof a second depressurization gas provided by the second adsorber vessel;

(10) further pressurizing the first adsorber vessel by introducing into the outlet thereof a first depressurization gas provided by the third adsorber vessel and introducing feed gas into the inlet of the first adsorber vessel;

(11) further pressurizing the first adsorber vessel by introducing a portion of the reformer gas into the inlet thereof; and

(12) repeating steps (1) through (11) in a cyclic manner.

The pressure of the reformer gas may be between about 15 and 800 psig.

Another embodiment of the invention relates to a method for the separation of a gas mixture comprising (a) providing a reformer gas containing hydrogen, carbon monoxide, carbon dioxide, methane, and nitrogen; providing a pressure swing adsorption system having a plurality of adsorber vessels, each vessel having an inlet and an outlet; providing a first bed of adsorbent material disposed within each adsorber vessel, wherein the first bed of adsorbent material is selective for the adsorption of carbon monoxide and nitrogen, and providing a second bed of adsorbent material disposed between the inlet of the adsorber vessel and the first bed of adsorbent, wherein the second bed of adsorbent material is selective for the adsorption of methane and carbon dioxide; initiating a feed step that comprises (1) introducing the reformer gas into the inlet of the adsorber vessel, passing the reformer gas consecutively through the second bed of adsorbent material and the first bed of adsorbent material, and (2) withdrawing a purified hydrogen product from the outlet of the adsorber vessel; continuing the feed step for a feed time period of about 30 seconds or less; and (f) terminating the feed step. The adsorbent material in the first bed may be characterized by any of (1) a Henry's law constant for carbon monoxide between about 2.5 and about 5.5 (mmole/g)/atm; (2) a carbon monoxide heat of adsorption between about 6.0 and about 7.5 kcal/gmole; (3) a Henry's law constant for nitrogen greater than about 1.5 (mmole/g)/atm; and (4) a selectivity of carbon monoxide to nitrogen between about 5.0 and about 8.0.

In this embodiment, the pressure swing adsorption system may have four or more adsorber vessels. The adsorbent material in the first bed may comprise a binder and type 5A zeolite that is 70% to 95% calcium exchanged. Alternatively, the adsorbent material in the first bed may be binderless and may comprise type 5A zeolite that is 60% to 91% calcium exchanged. The adsorbent material in the first bed may comprise activated carbon impregnated with CuCl. The adsorbent material in the second bed may comprise activated carbon.

DETAILED DESCRIPTION OF THE INVENTION

Figure 1:
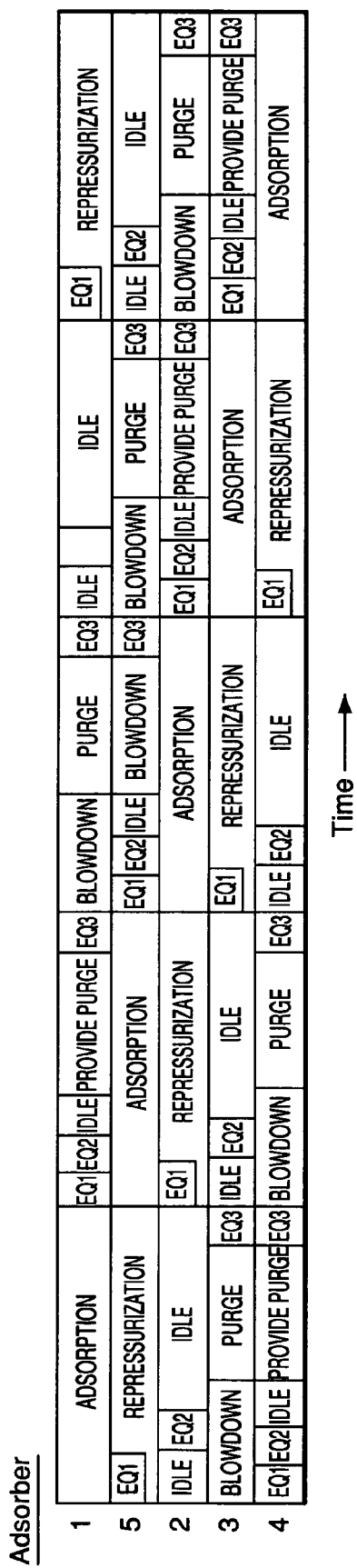
FIG. 1 is a cycle chart for an exemplary five-bed PSA system that may be used with an embodiment of the present invention.

Embodiments of the present invention relate to rapid cycle pressure swing adsorption (PSA) processes for the generation of high purity hydrogen wherein the removal of carbon monoxide from impure hydrogen feed is accomplished by using adsorbents with specific CO adsorption characteristics. The rapid cycle PSA processes utilize feed times of about 30 seconds or less, and it has been found that CO can be removed most efficiently in these rapid cycles by an adsorbent having a Henry's law constant for CO between about 2.5 and about 5.5 (mmole/g)/atm. Alternatively or additionally, this adsorbent may have a CO heat of adsorption between about 6.0 and about 7.5 kcal/gmole. When nitrogen is a contaminant in the impure hydrogen feed, the Henry's law constant for nitrogen on this adsorbent may be greater than about 1.5 (mmole/g)/atm. Alternatively or additionally, the selectivity of carbon monoxide to nitrogen on this adsorbent may be between about 5.0 and about 8.0. The invention may be used to produce high-purity hydrogen containing less than about 10 ppm CO.

In a PSA process, the terms "feed step" and "adsorption step" as used herein are equivalent and are defined as the introduction of feed gas into an adsorbent bed while withdrawing product gas from the bed. This step occurs during a feed time or a feed time period. When a specific adsorbent material is described herein as being selective for a specific component or components in a gas mixture, this means that the specific component or components are adsorbed on the adsorbent material to a greater extent than the other components in the gas mixture. Henry's law constant, $K_H$, is the well-known parameter that defines the limiting slope of an adsorption isotherm at low pressures where the isotherm is essentially linear. The selectivity of an adsorbent for one component relative to another component is defined as the ratio of the Henry's law constants of the two components.

The adsorbent material described herein may be in the form of particulate material such as granules, extrudates, pellets, beads, and powders. The particulate adsorbent materials described herein may use a binder or binders, or alternatively may be binderless. A binder is a material used to effectively bind fine zeolite powders together to give the required size, shape, and mechanical strength of the final particles. Typical binders include clays, alumina, silica, and silica/alumina. Typical binder quantities include 5 to 25 wt %. When a particulate adsorbent material is used in a rapid cycle PSA process having feed times of about 30 seconds or less, the average particle diameter may be selected advantageously to give an acceptable balance between mass transfer characteristics and pressure drop. For example, the average particle diameter of the adsorbent material may be between about 0.7 and about 1.3 mm.

As an alternative to the particulate form of adsorbent, the adsorbent material may be in the form of monolithic structures, honeycombs, adsorbent fabrics, and laminate sheets.

Some of the embodiments utilize Ca-exchanged type 5A zeolites wherein a portion of the sodium ions is replaced by calcium ions using known ion exchange methods. A bed of adsorbent material is defined as a mass of adsorbent material of any type retained within a vessel by appropriate mechanical means such that feed gas can be distributed into the bed and product gas can be withdrawn from the bed without disturbing the bed or dislodging adsorbent therefrom during process cycles. The terms "pressurization" and "repressurization" have identical meanings. The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The adsorbent materials described herein may be utilized in any appropriate rapid cycle PSA system known in the art for hydrogen purification. A rapid cycle is defined as any adsorption cycle wherein the duration of the feed step is 30 seconds or less. For example, a typical PSA system with multiple parallel beds may be used wherein each bed proceeds in turn through a feed step, one or more depressurization steps with gas transfer to another bed or other beds undergoing pressurization, a provide purge depressurization step wherein the depressurization gas is used to purge another bed, a waste gas blowdown step, a purge step, one or more pressurization steps with gas transfer from another bed or other beds undergoing depressurization, and a final pressurization step using feed gas. The rapid cycle PSA process used in embodiments of the present invention may have a feed step duration or feed time period of about 30 seconds or less.

A bed may contain a single adsorbent or may comprise a combination of adsorbents. For example, the bed may use a layer of activated carbon at the bed inlet followed by a layer of zeolite. Any appropriate activated carbon may be used, and may be selected, for example, from the exemplary commercially-available materials Calgon OLC, Calgon APHP, Jacobi GXK, and Norit RB-1. Any appropriate zeolite may be used, and may be selected, for example, from the exemplary commercially-available zeolite types 5A, 13X, and BaX, or ion-exchanged versions thereof.

An exemplary hydrogen PSA process is illustrated in the cycle chart of FIG. 1, which describes the operation of a pressure swing adsorption system with five parallel adsorber vessels and shows the steps occurring in each of the adsorber beds as a function of time. Each adsorber vessel has an inlet and an outlet and contains a first bed of adsorbent material selective for the adsorption of carbon monoxide and optionally nitrogen. Each vessel also contains a second bed of adsorbent material selective for the adsorption of methane and carbon dioxide, wherein the second bed is disposed between the vessel inlet and the first bed.

Each adsorber vessel is subjected in turn to the following cyclic process steps:

(1) introducing the gas mixture during a feed time period of about 30 seconds or less as a feed gas into the inlet of a first adsorber vessel during an adsorption step, passing the gas mixture through the bed of particulate adsorbent material and adsorbing therein one or more components from the gas mixture, and withdrawing the product gas from the outlet of the adsorber vessel;

(2) depressurizing the first adsorber vessel by withdrawing a first depressurization gas from the outlet thereof and introducing the first depressurization gas into the outlet of a second adsorber vessel that is being repressurized;

(3) further depressurizing the first adsorber vessel by withdrawing a second depressurization gas from the outlet thereof and introducing the second depressurization gas into the outlet of a third adsorber vessel that is being repressurized;

(4) further depressurizing the first adsorber vessel by withdrawing a third depressurization gas from the outlet thereof as a provide purge gas and introducing the third depressurization gas into the outlet of a fourth adsorber vessel that is being purged;

(5) further depressurizing the first adsorber vessel by withdrawing a fourth depressurization gas from the outlet thereof and introducing the fourth depressurization gas into the outlet of the fourth adsorber vessel that is being repressurized;

(6) further depressurizing the first adsorber vessel by withdrawing a waste gas from the inlet thereof;

(7) purging the first adsorber vessel by introducing into the outlet thereof a third depressurization gas provided by the fifth adsorber vessel and withdrawing from the inlet of the first adsorber vessel a purge waste gas;

(8) pressurizing the first adsorber vessel by introducing into the outlet thereof a fourth depressurization gas provided by the fifth adsorber vessel;

(9) further pressurizing the first adsorber vessel by introducing into the outlet thereof a second depressurization gas provided by the second adsorber vessel;

(10) further pressurizing the first adsorber vessel by introducing into the outlet thereof a first depressurization gas provided by the third adsorber vessel and introducing feed gas into the inlet of the first adsorber vessel;

(11) further pressurizing the first adsorber vessel by introducing feed gas into the inlet thereof; and

(12) repeating steps (1) through (11) in a cyclic manner.

Steps (2), (3), and (5) are typically described in the art as pressure equalization steps, although the pressures in the two beds that are exchanging gas may not actually be equal at the end of the step. Depressurization step (6) may be described as a blowdown step and typically the waste gas from this step is withdrawn at pressures above or at atmospheric pressure. The purge waste gas from the inlet of an adsorber vessel during the purge step is withdrawn at the lowest pressure in the PSA cycle, and this pressure may be above, at, or below atmospheric pressure. Idle steps are utilized as necessary to balance out the cycle steps among the multiple adsorbers.

Figure 2:
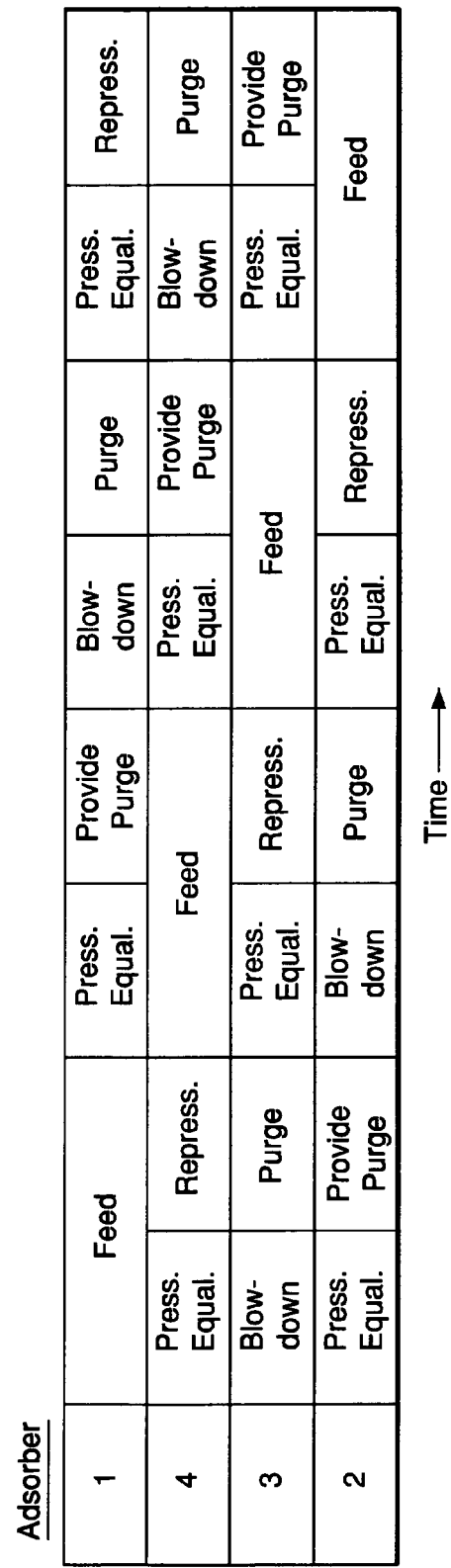
FIG. 2 is a cycle chart for an exemplary four-bed PSA system that may be used with an embodiment of the present invention.

Other adsorber systems and cycles may be used with the adsorbents of the present invention wherein the feed time period is 30 seconds or less. For example, a system having four adsorber vessels and a cycle with one pressurization-depressurization gas transfer step may be used as illustrated in the cycle chart of FIG. 2 Idle steps may utilized if necessary (not shown) to balance out certain cycle steps among the multiple adsorbers.

The bed of adsorbent in each adsorber vessel used in the PSA processes described above typically is a cylindrical bed in a cylindrical vessel. Alternatively, the bed of adsorbent may be configured within the adsorber vessel as a radial bed or as a horizontal bed, both of which are known in the adsorption art.

The following Examples illustrate embodiments of the present invention but do not limit the invention to any of the specific details described therein.

EXAMPLE 1

A multiple-bed pilot unit was operated in a five bed configuration to measure $H_2$ PSA performance for a feed gas composition of 14.9% $CO_2$, 5.1% $CH_4$, 5.5% CO, 0.25% $N_2$ and 74.2% $H_2$. The feed pressure was 440 psig and the feed temperature was 70° F. The 5 bed PSA cycle of FIG. 1 was employed having three equalization steps and a feed time of 266 seconds. The final $H_2$ product contained 3 ppmv CO. Each bed contained 63 vol % activated carbon (Calgon type APHP) on the feed end of the bed and 37% zeolite on the product end of the bed. Both adsorbents had an average particle diameter of about 2 mm. Various final layer zeolites were tested including a highly exchanged binderless type 5A (CaA), a binderless type 13X (NaX), and two 5A samples with varying Ca exchange levels. Table 1 presents results of the testing in addition to the CO Henry's law constant (initial isotherm slope) at 70° F. The adsorption isotherms were measured in a standard volumetric adsorption unit. The lowest partial pressure measured during isotherm measurement was 10 torr (0.013 atma); the isotherms were in the linear range and good Henry's law constants were obtained.

TABLE 1

Henry's Law Constants and Relative Feed Loadings for CO (Example 1)

| Adsorbent | $K_H$ CO @ 70° F., (mmole/g)/atm | Relative feed loading |
|---|---|---|
| Binderless 5A (95% Ca exchange) | 6.3 | 1.0 |
| 5A (78% Ca exchange) | 3.3 | 1.04 |
| 5A (67% Ca exchange) | 2.4 | 1.03 |
| Binderless 13X | 1.9 | 1.08 |

The relative feed loading gives the total amount of feed gas that can be processed for a given volume of bed; higher feed loadings are desired. Materials with low CO Henry's law constants generally are preferred for embodiments of the present invention.

EXAMPLE 2

The multiple-bed pilot unit was operated in a PSA cycle using a four bed configuration to determine the effect of zeolite type on $H_2$ PSA performance using reformer gas feed with a composition (in mole%) of 1% $N_2$, 3% CO, 5% $CH_4$, 19% $CO_2$ and 72% $H_2$. The PSA cycle used one equalization step and the cycle chart is given in FIG. 2. The feed pressure was 120 psig, the feed temperature was 70° F., and the feed time was 24 seconds. The adsorbent vessels were filled with 60 vol % activated carbon (Calgon type PCB) on the feed end of the vessel and 40 vol % zeolite on the product end of the vessel. In this rapid cycle testing, the average particle diameters were about 1 mm. The results of the testing are shown in Table 2 and FIG. 3.

TABLE 2

Henry's Law Constants and Relative Feed Loadings for CO (Example 2)

| Adsorbent | $K_H$ CO @ 70° F., (mmole/g)/atm | Relative feed loading |
|---|---|---|
| 13X | 1.6 | 1.08 |
| BaX | 3.4 | 1.19 |
| Binderless 5A (78% Ca exchange) | 4.6 | 1.21 |
| Binderless 5A | 6.3 | 1.0 |

TABLE 2-continued

Henry's Law Constants and Relative Feed Loadings for CO (Example 2)

| Adsorbent | $K_H$ CO @ 70° F., (mmole/g)/atm | Relative feed loading |
|---|---|---|
| (95% Ca exchange) | | |

Figure 3:
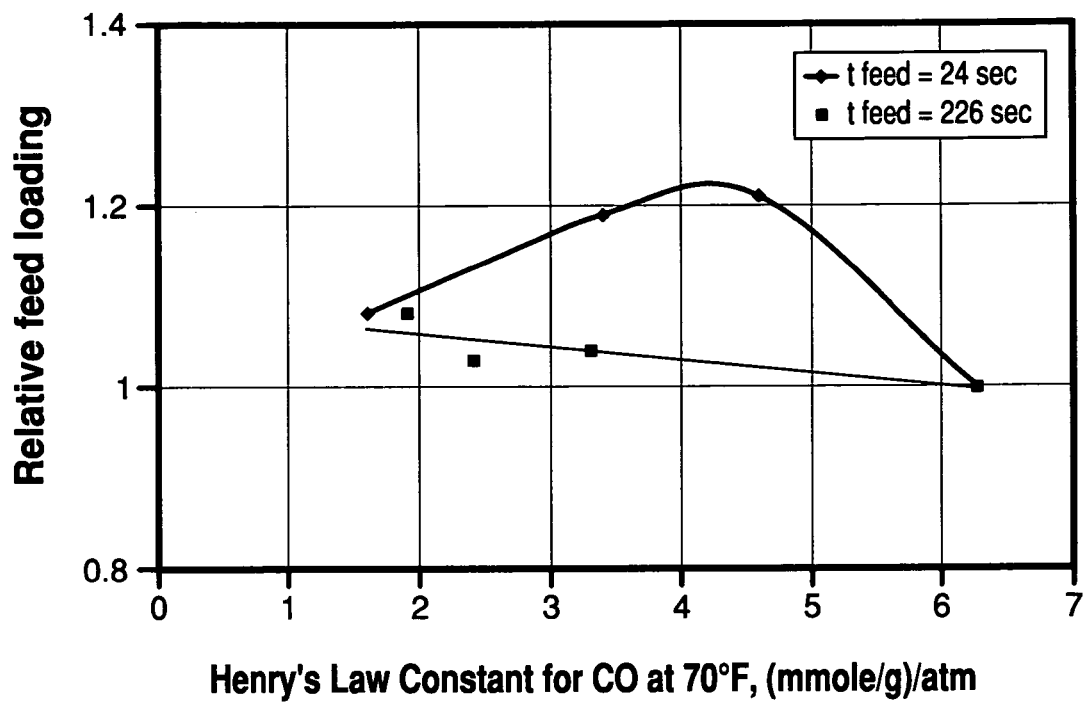
FIG. 3 is a plot of relative feed loading vs. the Henry's law constant for CO according to an embodiment of the present invention.

From the results shown in Table 2 and FIG. 3, it is seen that the relative feed loading goes through an optimum when the CO Henry's law constant is about (4 mmole/g)/atm. This is in contrast to the long cycle PSA results presented in Table 1. The effect of CO Henry's law constant on relative feed loading for short (Example 2) and long (Example 1) feed times is compared in FIG. 3. It is seen that at short feed times, values of the Henry's law constant in the range of about 2.5 to about 5.5 give the highest relative feed loading. In contrast, the relationship between Henry's law constant and relative feed loading is linear at long feed times, and the highest relative feed loadings are obtained at the lowest Henry's law constants. As feed times are decreased from 226 seconds, the relationship between the CO Henry's law constant and relative feed loading will change from essentially linear as shown for 226 seconds to a curve having a maximum as shown for 24 seconds. From these data, it is concluded that at feed times below about 30 seconds the preferred Henry's law constant for CO is in the range of about 2.5 to about 5.5.

EXAMPLE 3

The performance of adsorbents for rapid cycle PSA applications typically is determined by their mass transfer properties. Clearly, the performance of adsorbents in PSA applications is a function of both the equilibrium and kinetic properties of the materials. Therefore, the $N_2$ mass transfer coefficient for each adsorbent tested in Example 2 was measured by a volumetric uptake experiment at 70° F. The rate of $N_2$ adsorption was fit to a linear driving force equation and the $N_2$ mass transfer coefficient was determined. The linear driving force equation is $dn/dt=k(n_{eq}-n_t)$, where n is the amount adsorbed, t is time, $n_{eq}$ is the amount adsorbed at equilibrium, $n_t$ is the amount adsorbed at time t, and k is the mass transfer coefficient. Table 3 shows the $N_2$ mass transfer coefficients determined for the materials tested in Example 2.

TABLE 3

Mass Transfer Coefficients in Example 2

| Adsorbent | $N_2$ mass transfer coefficient, (sec$^{-1}$) |
|---|---|
| 13X | 2.4 |
| BaX | 1.5 |
| Binderless 5A (78% Ca exchanged) | 1.6 |
| Binderless 5A (95% Ca exchanged) | 1.4 |

These results show that the type 13X adsorbent had the highest $N_2$ mass transfer coefficient, but this adsorbent did not show the best PSA performance as shown in Example 2. The other three adsorbents had nearly the same mass transfer coefficient. These results show that the equilibrium adsorption properties are very important in determining optimum PSA performance in rapid cycle PSA processes.

EXAMPLE 4

$N_2$ isotherms were measured for the above adsorbents and used to determine the Henry's law constants. The results are summarized in Table 4, which gives the Henry's law constants for CO and $N_2$, the CO/$N_2$ selectivity ($K_H$ CO/$K_H$ $N_2$), all measured at 70° F., and the corresponding relative feed loading for the adsorbents tested in Examples 1 and 2. The results in Table 4 are shown in graphical form in FIG. 4.

TABLE 4

Henry's Law Constants, CO/N2 Selectivities, Feed Times, and Relative Feed Loadings for Example 4

| Adsorbent | $K_H$ CO @ 70° F., (mmole/g)/atm | $K_H$ $N_2$ @ 70° F., (mmole)/g/atm | CO/$N_2$ Selectivity | Feed time, sec | Relative feed loading |
|---|---|---|---|---|---|
| Binderless 5A (95% Ca exchange) | 6.3 | 0.75 | 8.4 | 266 | 1.0 |
| 5A (78% Ca exchange) | 3.3 | 0.47 | 7.0 | 266 | 1.04 |
| 5A (67% Ca exchange) | 2.4 | 0.43 | 5.6 | 266 | 1.03 |
| Binderless 13X | 1.9 | 0.43 | 4.4 | 266 | 1.08 |
| 13X | 1.6 | 0.36 | 4.4 | 24 | 1.08 |
| BaX | 3.4 | 0.49 | 6.9 | 24 | 1.19 |
| Binderless 5A (78% Ca exchange) | 4.6 | 0.63 | 7.3 | 24 | 1.21 |
| Binderless 5A (95% Ca exchange) | 6.3 | 0.75 | 8.4 | 24 | 1.0 |

Figure 4:
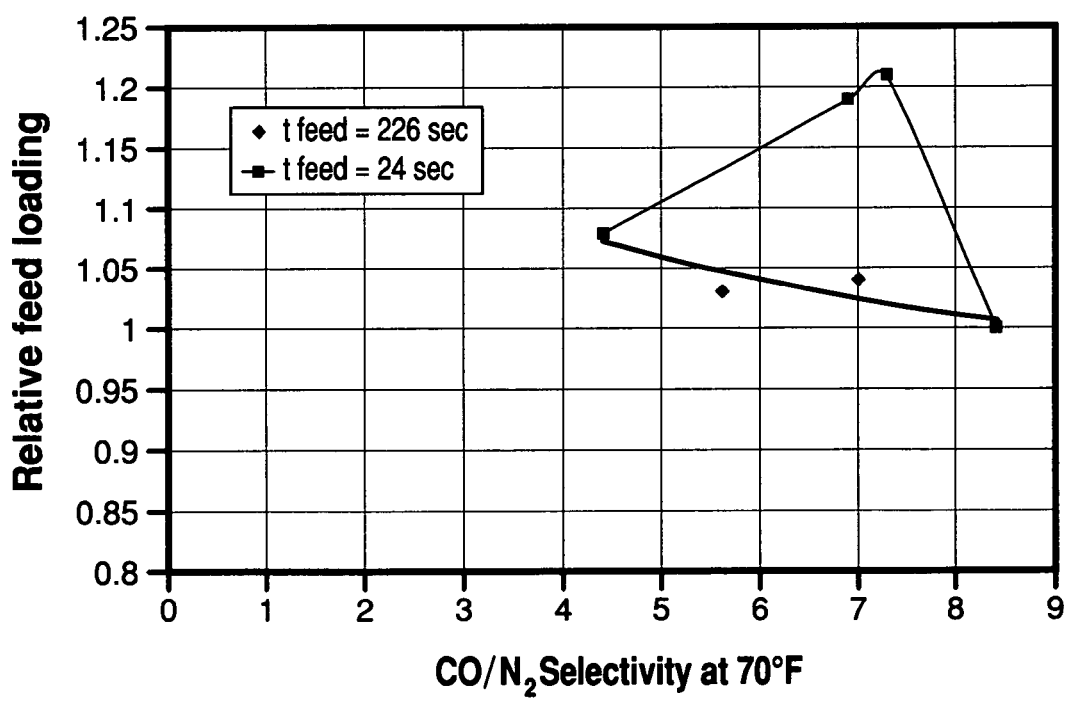
FIG. 4 is a plot of relative feed loading vs. the CO to nitrogen selectivity according to an embodiment of the present invention.

As can be seen from FIG. 4, the CO/$N_2$ selectivity vs. relative feed loading at a feed time of 266 second is linear, and the relative feed loading is about 1.08 at the lowest measured selectivity. However, the CO/$N_2$ selectivity at the 24 second feed time is highest in an optimum range of about 5 to about 8. These results indicate that the most advantageous CO/$N_2$ selectivity for optimum PSA performance is a function of cycle time. It is concluded from FIG. 4 that at feed times of about 30 seconds or less the most advantageous CO/$N_2$ selectivity at 70° F. lies between about 5.0 to about 8.0. In contrast, for longer cycle times the relative feed loading decreases linearly as $CO/N_2$ selectivity increases and the most advantageous $CO/N_2$ selectivity is less than 5.

EXAMPLE 5

The embodiments of the present invention may used to produce $H_2$ with a low CO impurity level of 10 ppmv or less. Since most reformer gases contain $N_2$, which is more weakly adsorbed than CO, the $N_2$ impurity typically is higher than 10 ppmv when the CO impurity in the $H_2$ product is 10 ppmv. Although there may be no maximum allowable $N_2$ concentration in the $H_2$ product, it is advantageous to remove as much $N_2$ as possible because in many applications the $N_2$ impurity can build up in a downstream process that consumes the $H_2$ product. This is undesirable because periodic purging of the downstream process may be necessary to remove the $N_2$. In other uses of the $H_2$ product, for example, in fuel cells, lower $N_2$ concentrations are desired. Table 5 shows the percentage of feed $N_2$ removed with the optimum adsorbents for short and long feed times at 1 ppmv CO in the $H_2$ product.

TABLE 5

Nitrogen Removal From Product Hydrogen in Example 5

| Adsorbent | Feed time, sec | % $N_2$ removal at 1 ppmv CO in $H_2$ Product |
| --- | --- | --- |
| Binderless 13X | 266 | 83% |
| Binderless 5A (78% Ca exchange) | 24 | 97% |

From the results shown in Table 5, it is clear that the best adsorbent for short PSA feed times also gives enhanced $N_2$ removal.

EXAMPLE 6

Figure 5:
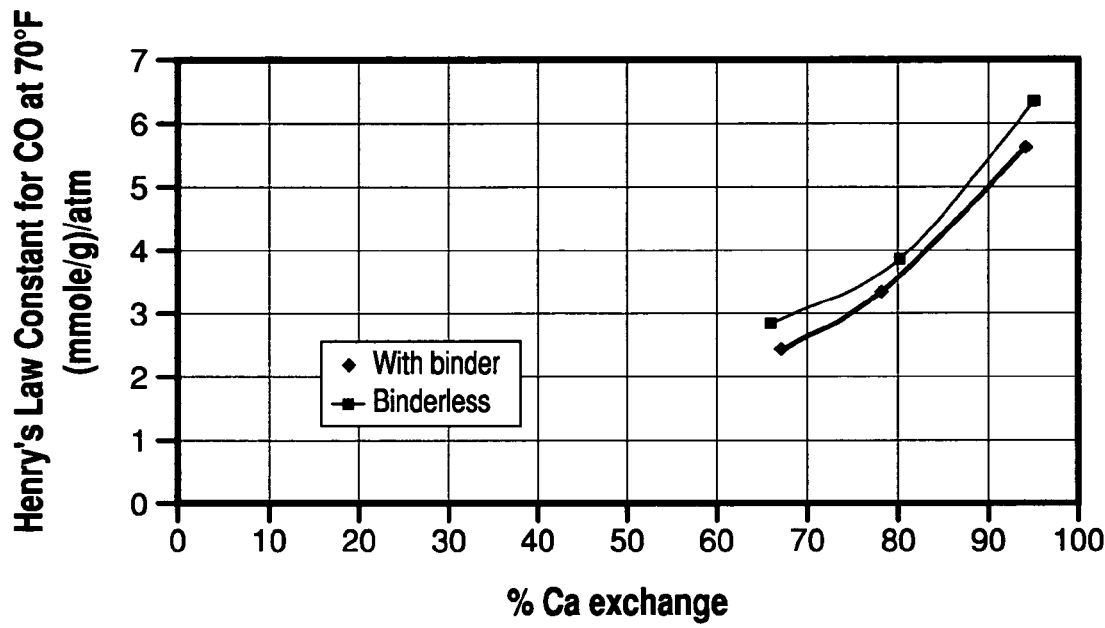
FIG. 5 is a plot of the Henry's law constant for CO vs. % Ca exchange for bound and binderless type 5A zeolite adsorbent used with an embodiment of the present invention.

It has been determined that the extent of Ca exchange has a strong effect on its performance for dilute CO removal from $H_2$. Table 2 shows that a binderless type 5A zeolite adsorbent with 78% Ca exchange has about 20% better performance than a similar adsorbent exchanged to 95% Ca. FIG. 5 shows the effect of Ca exchange level on The Henry's law constant for CO at 70° F. for both bound and binderless materials. As indicated in previous Examples, the optimal $K_H$CO at 70° F. is from about 2.5 to about 5.5 (mmole/g)/atm. In order to achieve this range of Henry's law constants, 5A with binder should have a Ca exchange level of about 70 to about 95%, while for binderless 5A, the preferred Ca exchange level is from about 60 about 91%.

EXAMPLE 7

Figure 6:
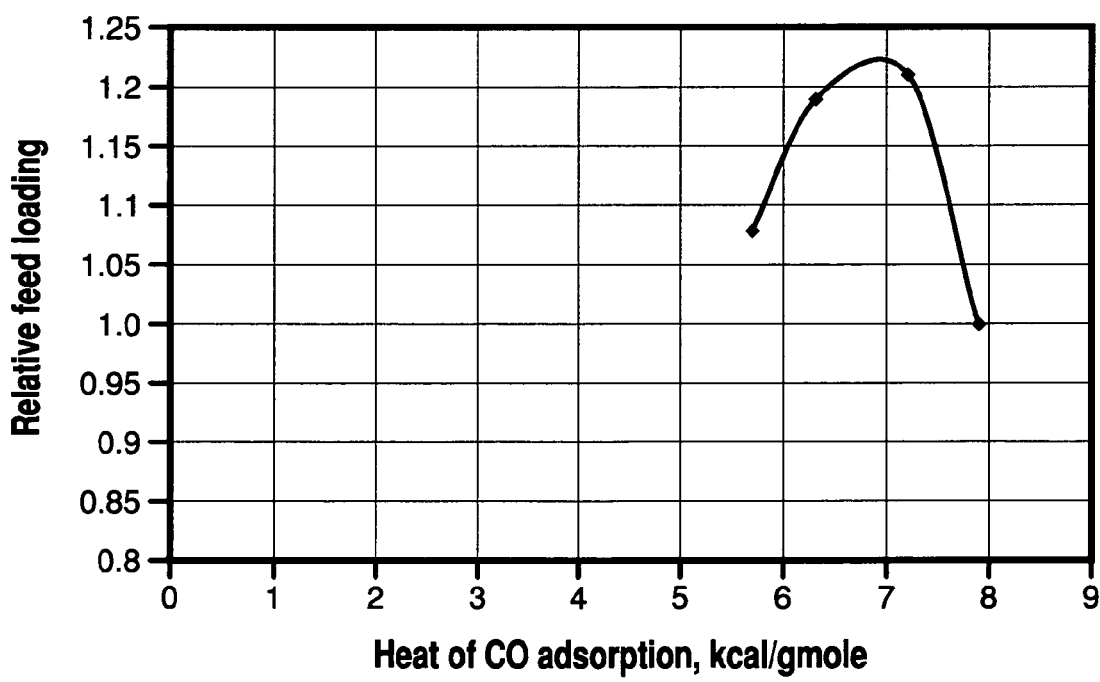
FIG. 6 is a plot of relative feed loading vs. the CO heat of adsorption according to an embodiment of the present invention.

It has been determined that the heat of CO adsorption has a strong effect on its PSA performance for CO removal from $H_2$. Heats of adsorption were determined by measuring CO adsorption isotherms at two temperatures, determining Henry's law constants from these isotherms at pressures below 10 torr, and using the Clausius-Clayperon equation to derive the heats of CO adsorption in the Henry's law region. FIG. 6 shows the relation between the CO heat of adsorption and the relative feed loading at 24 second feed times. It is seen that the PSA performance is a strong function of the heat of CO adsorption and that optimum PSA performance is obtained when the CO heat of adsorption is between about 6.0 and about 7.5 kcal/gmole. For reference, the heat of CO adsorption on CaX is about 9.0 kcal/gmole and that for LiX is 8.2 kcal/gmole, both above the optimum determined here.

The invention claimed is:

1. A method for the separation of a gas mixture comprising
   (a) providing a feed gas mixture containing at least hydrogen and carbon monoxide and optionally containing nitrogen;
   (b) providing a pressure swing adsorption system having a plurality of adsorber vessels, each vessel having an inlet and an outlet;
   (c) providing a bed of adsorbent material disposed within each adsorber vessel, wherein the adsorbent material is selective for the adsorption of carbon monoxide and nitrogen; and
   (d) initiating a feed step that comprises (1) introducing the feed gas mixture into the inlet of the adsorber vessel, passing the feed gas mixture through the bed of adsorbent material wherein at least a portion of the carbon monoxide is adsorbed by the adsorbent material and wherein, if nitrogen is present in the gas mixture, at least a portion of the nitrogen is adsorbed by the adsorbent material; and (2) withdrawing a purified hydrogen product from the outlet of the adsorber vessel;
   (e) continuing the feed step for a feed time period of about 30 seconds or less; and
   (f) terminating the feed step;
wherein the adsorbent material is characterized by any of
   (1) a Henry's law constant for carbon monoxide between about 2.5 and about 5.5 (mmole/g)/atm;
   (2) a carbon monoxide heat of adsorption between about 6.0 and about 7.5 kcal/gmole; and
   (3) a selectivity of carbon monoxide to nitrogen between about 5.0 and about 8.0.

2. The method of claim 1 wherein the adsorbent material comprises a binder and type 5A zeolite that is 70% to 95% calcium exchanged.

3. The method of claim 1 wherein the adsorbent material is binderless and comprises type 5A zeolite that is 60% to 91% calcium exchanged.

4. The method of claim 1 wherein the feed gas mixture contains hydrogen, carbon monoxide, and nitrogen and is provided by passing a reformer gas containing hydrogen, carbon monoxide, carbon dioxide, methane, and nitrogen through a bed of activated carbon to remove essentially all of the carbon dioxide and methane from the reformer gas.

5. The method of claim 1 wherein each adsorber vessel comprises an additional bed of adsorbent material disposed between the inlet of the adsorber vessel and the bed of adsorbent material that is selective for the adsorption of carbon monoxide and nitrogen, wherein the additional bed of adsorbent material is selective for the adsorption of methane and carbon dioxide.

6. The method of claim 5 wherein the pressure swing adsorption system has four parallel adsorber vessels and each adsorber vessel is subjected in turn to the cyclic process steps comprising
   (1) introducing a reformer gas containing hydrogen, carbon monoxide, carbon dioxide, methane, and nitrogen during the feed time period into the inlet of a first adsorber vessel, passing the reformer gas through the beds of adsorbent material and adsorbing therein methane, carbon dioxide, carbon monoxide, and nitrogen from the reformer gas, and withdrawing the purified hydrogen product from the outlet of the adsorber vessel;
   (2) depressurizing the first adsorber vessel by withdrawing a first depressurization gas from the outlet thereof and introducing the first depressurization gas into the outlet of a second adsorber vessel that is being repressurized;

(3) further depressurizing the first adsorber vessel by withdrawing a second depressurization gas from the outlet thereof and introducing the second depressurization gas into the outlet of a third adsorber vessel that is being purged;

(4) further depressurizing the first adsorber vessel by withdrawing a waste gas from the inlet thereof;

(5) purging the first adsorber vessel by introducing into the outlet thereof a second depressurization gas provided by a fourth adsorber vessel and withdrawing from the inlet of the first adsorber vessel a purge waste gas;

(6) pressurizing the first adsorber vessel by introducing into the outlet thereof a first depressurization gas provided by the second adsorber vessel;

(7) further pressurizing the first adsorber vessel by introducing a portion of the reformer gas into the inlet thereof; and (8) repeating steps (1) through (7) in a cyclic manner.

7. The method of claim 6 wherein the pressure of the reformer gas is between about 15 and 800 psig.

8. The method of claim 5 wherein the pressure swing adsorption system has five parallel adsorber vessels and each adsorber vessel is subjected in turn to the cyclic process steps comprising (1) introducing a reformer gas during the feed time period into the inlet of a first adsorber vessel, passing the reformer gas through the beds of adsorbent material and adsorbing therein methane, carbon dioxide, carbon monoxide, and nitrogen from the reformer gas, and withdrawing the purified hydrogen product from the outlet of the adsorber vessel;

(2) depressurizing the first adsorber vessel by withdrawing a first depressurization gas from the outlet thereof and introducing the first depressurization gas into the outlet of a second adsorber vessel that is being repressurized;

(3) further depressurizing the first adsorber vessel by withdrawing a second depressurization gas from the outlet thereof and introducing the second depressurization gas into the outlet of a third adsorber vessel that is being repressurized;

(4) further depressurizing the first adsorber vessel by withdrawing a third depressurization gas from the outlet thereof and introducing the third depressurization gas into the outlet of a fourth adsorber vessel that is being purged;

(5) further depressurizing the first adsorber vessel by withdrawing a fourth depressurization gas from the outlet thereof and introducing the fourth depressurization gas into the outlet of the fourth adsorber vessel that is being repressurized;

(6) further depressurizing the first adsorber vessel by withdrawing a waste gas from the inlet thereof;

(7) purging the first adsorber vessel by introducing into the outlet thereof a third depressurization gas provided by a fifth adsorber vessel and withdrawing from the inlet of the first adsorber vessel a purge waste gas;

(8) pressurizing the first adsorber vessel by introducing into the outlet thereof a fourth depressurization gas provided by the fifth adsorber vessel;

(9) further pressurizing the first adsorber vessel by introducing into the outlet thereof a second depressurization gas provided by the second adsorber vessel;

(10) further pressurizing the first adsorber vessel by introducing into the outlet thereof a first depressurization gas provided by the third adsorber vessel and introducing feed gas into the inlet of the first adsorber vessel;

(11) further pressurizing the first adsorber vessel by introducing a portion of the reformer gas into the inlet thereof; and

(12) repeating steps (1) through (11) in a cyclic manner.

9. The method of claim 8 wherein the pressure of the reformer gas is between about 15 and 800 psig.

10. A method for the separation of a gas mixture comprising (a) providing a reformer gas containing hydrogen, carbon monoxide, carbon dioxide, methane, and nitrogen;

(b) providing a pressure swing adsorption system having a plurality of adsorber vessels, each vessel having an inlet and an outlet;

(c) providing a first bed of adsorbent material disposed within each adsorber vessel, wherein the first bed of adsorbent material is selective for the adsorption of carbon monoxide and nitrogen, and providing a second bed of adsorbent material disposed between the inlet of the adsorber vessel and the first bed of adsorbent, wherein the second bed of adsorbent material is selective for the adsorption of methane and carbon dioxide;

(d) initiating a feed step that comprises (1) introducing the reformer gas into the inlet of the adsorber vessel, passing the reformer gas consecutively through the second bed of adsorbent material and the first bed of adsorbent material, and (2) withdrawing a purified hydrogen product from the outlet of the adsorber vessel;

(e) continuing the feed step for a feed time period of about 30 seconds or less; and (f) terminating the feed step;

wherein the adsorbent material in the first bed is characterized by any of (1) a Henry's law constant for carbon monoxide between about 2.5 and about 5.5 (mmole/g)/atm;

(2) a carbon monoxide heat of adsorption between about 6.0 and about 7.5 kcal/gmole;

(3) a selectivity of carbon monoxide to nitrogen between about 5.0 and about 8.0.

11. The method of claim 10 wherein the pressure swing adsorption system has four or more adsorber vessels.

12. The method of claim 10 wherein the adsorbent material in the first bed comprises a binder and type 5A zeolite that is 70% to 95% calcium exchanged.

13. The method of claim 10 wherein the adsorbent material in the first bed is binderless and comprises type 5A zeolite that is 60% to 91% calcium exchanged.

14. The method of claim 10 wherein the adsorbent material in the first bed comprises activated carbon impregnated with CuCl.

15. The method of claim 10 wherein the adsorbent material in the second bed comprises activated carbon.

* * * * *